United States Patent Office 3,197,859
Patented Aug. 3, 1965

3,197,859
METHODS OF BRAZING
Arthur T. Cape, Monterey, Calif., assignor to Coast Metals, Inc., Little Ferry, N.J., a corporation of Delaware
No Drawing. Filed Feb. 9, 1965, Ser. No. 431,460
5 Claims. (Cl. 29—501)

This application is a continuation-in-part of my application Serial No. 28,224, filed May 11, 1960, and now abandoned, and of my copending application Serial No. 339,907, filed January 24, 1964, and now abandoned.

This invention relates generally to methods of brazing, but has reference more particularly to methods of brazing in which brazing alloys of the copper-manganese type are employed, and to the use of such alloys for brazing complicated parts such as honeycomb structures, which present difficulties when completely sound joints are essential.

Equilibrium diagrams, which were published some years ago, suggested the possibility of using copper-manganese alloys for brazing, as their melting points, in the range of 85% copper-15% manganese to 55% manganese-45% copper, are lower than those of copper, nickel-silicon-boron alloys, and the manganese base alloys.

The melting point of copper is nearly 2000° F., whereas the melting point of an alloy containing 75% copper and 25% manganese, provided the pure elements are used, is about 1600° F. The brazing temperature for copper is about 2050° F., whereas the brazing temperature for this specific copper-manganese alloy is about 1650° F.–1700° F. A 2T lap joint made of plain carbon steel pieces brazed with copper failed at 38,000 p.s.i (measured as the area of the brazed section) in the braze itself when tested at 800° F., whereas a similar lap joint brazed with this specific copper-maganese alloy, slightly modified, as hereinafter described, failed at 67,000 p.s.i., but failure took place in the base material. The lap joint test referred to is a test in which strips of the metals to be brazed are lapped to an extent double the thickness of each of the strips, and a gap of .001″ to .060″, depending upon the properties which are sought, is provided between the strips.

I have found that the addition of cobalt, in substantial amounts, to such copper-manganese alloys, is effective to greatly strengthen such alloys for brazing purposes, as well as to aid the flow of such alloys on silicon- and titanium-containing stainless steels and the so-called super alloys, and to increase the high temperature properties of the brazing alloys. The cobalt also eliminates any tendency of the brazing alloy to crack, when used as a welding rod for joining parts. The cobalt-containing brazing alloy does not dissolve the base materials markedly, and therefore may be used for joining their sections either by conventional welding methods or by brazing in furnaces containing protective atmospheres. Cobalt may be used in amounts of from about 3% to about 18%.

As illustrative of the effect of cobalt in increasing the strength of copper-manganese alloys for brazing purposes, cobalt, in varying amounts, was added to an alloy consisting of about 75% copper and about 25% manganese, and these were subjected to tensile tests, performed on butt-jointed specimens of 347 stainless, with the brazing alloy at the butt joint. The results of these tests were as follows:

| Amt. of Cobalt Added | Ultimate Strength, p.s.i. | Elongation, Percent | Site of Failure |
|---|---|---|---|
| None | 78,000 | 28 | In braze. |
| 5% | 85,000 | 34 | Heat affected zone in base metal. |
| 9% | 92,500 | 64 | Away from braze. |
|  |  | 49 | In heat affected zone in base metal. |
| 15% | 92,700 | 63 | Away from braze. |
|  |  | 44 | In heat affected zone in base metal. |

The effect of cobalt on the basic alloy of 75% copper and 25% manganese, as to ultimate strength, elongation, and location and nature of the failure is clearly shown in this tabulation.

The brazing alloys which may be used for the purpose of brazing stainless steels and super alloys of the type referred to consist of from about 40 to about 75% copper, from about 3% to about 18% cobalt and the balance essentially all manganese, but in an amount not less than about 20%.

However, where crevice corrosion is a problem, as described in my copending application Serial No. 339,557, nickel may be added to the brazing alloys, in amounts of from about 3% to about 20%, the nickel replacing a portion of the copper and/or manganese. The nickel, in such case, replaces at least one of the metals selected from the group consisting of copper and manganese, but the resulting relative proportions of copper, manganese, cobalt and nickel in the alloy are such that the copper is never less than about 40%, the manganese is never less than about 20%, and the nickel constitutes between about 3% and about 20% of the alloy.

Examples of brazing alloys which fall within the foregoing ranges, and which are particularly adapted for the present brazing process, are as follows:

|  | No. 1, percent | No. 2, percent | No. 3, percent | No. 4, percent |
|---|---|---|---|---|
| Copper | 67.5 | 63.0 | 62.5 | 50.0 |
| Cobalt | 9.0 | 10.0 | 8.25 | 5.0 |
| Manganese | 23.5 | 22.0 | 21.0 | 36.0 |
| Nickel | None | 5.0 | 8.25 | 9.0 |

The No. 1 alloy is used primarily where the strength of the joint is the principal factor, the alloy having a melting point of about 1725° F. The recommended brazing temperature for this alloy is about 1825° F.

The No. 2 alloy may be used in the form of powder, wire or foil, and was developed specifically for the brazing and welding of high alloy steels, particularly where thin sections are involved and a minimum of penetration or erosion is required. Brazing of 347 and 321 stainless steels in the 300 series, and heat resisting steels are typical examples.

The No. 2 alloy has a liquidus of 1755° F., a solidus of 1730° F., and a recommended brazing temperature of 1850° F. It is used for controlled atmosphere brazing with hydrogen or inert gases, and produces sound, tight joints, with excellent strength retention at elevated service temperatures in a wide range of high strength steels. Its oxidation- and corrosion-resistance is good. In the form of wire, it has good welding properties and is well suited to use with the inert arc processes.

Its physical properties, in the annealed condition, are as follows:

Ultimate strength _____ p.s.i.__ 109,000
Yield strength _____ p.s.i.__ 57,000
Elongation _____ percent__ 18

The No. 3 and No. 4 alloys are similar, in most respects, to the No. 2 alloy.

The brazing temperature range for the alloys of the present invention is from about 1600° F. to about 1900° F.

It will be understood that slight changes may be made in the alloy, without departing from the spirit of the invention or the scope of the appended claims.

Having thus described my invention, I claim:

1. In the brazing of parts of stainless steel and super alloys, the step of brazing the parts by interposing between the parts to be brazed a brazing alloy consisting essentially of from about 40% to about 75% copper, from about 3% to about 18% cobalt, and the remainder essentially all manganese but in an amount not less than about 20%, and heating the parts and brazing alloy to a brazing temperature range of from about 1600° F. to about 1900° F., whereby the parts are brazed to each other, and the cobalt is effective to greatly increase the strength of the brazed joint.

2. The brazing method, as defined in claim 1, in which nickel, in amounts of from about 3% to about 20% replaces at least one of the metals selected from the group consisting of copper and manganese, but the resulting relative proportions of copper, manganese and nickel in the alloy being such that the copper is never less than about 40%, the manganese is never less than about 20%, and the nickel constitutes between about 3% and about 20% of the brazing alloy.

3. In the brazing of parts of stainless steel and super alloys, the step of brazing the parts by interposing between the parts to be brazed a brazing alloy consisting of about 67.5% copper, about 9.0% cobalt, and about 23.5% manganese, and heating the brazing alloy and parts to a brazing temperature of about 1825° F. to braze the parts together.

4. In the brazing of parts of stainless steel and super alloys, the step of brazing the parts by interposing between the parts to be brazed a brazing alloy consisting of about 63.0% copper, about 5.0% nickel, about 10% cobalt, and about 22% manganese, and heating the brazing alloy and parts to a brazing temperature of about 1850° F. to braze the parts together.

5. In the brazing of parts of stainless steel and super alloys, the step of brazing the parts by interposing between the parts to be brazed a brazing alloy consisting of about 50% copper, about 5.0% cobalt, about 9.0% nickel, and about 36% manganese, and heating the brazing alloy and parts to a brazing temperature to braze the parts together.

References Cited by the Examiner

UNITED STATES PATENTS 2,856,281  10/58  Cremer et al.
3,005,258  10/61  Sanadahl _____ 29—494
3,124,451  3/64   Cape.

JOHN F. CAMPBELL, *Primary Examiner.*